Oct. 12, 1937.  A. G. ROCKWOOD  2,095,287
STEAM VALVE GEAR
Filed June 13, 1935  6 Sheets-Sheet 6
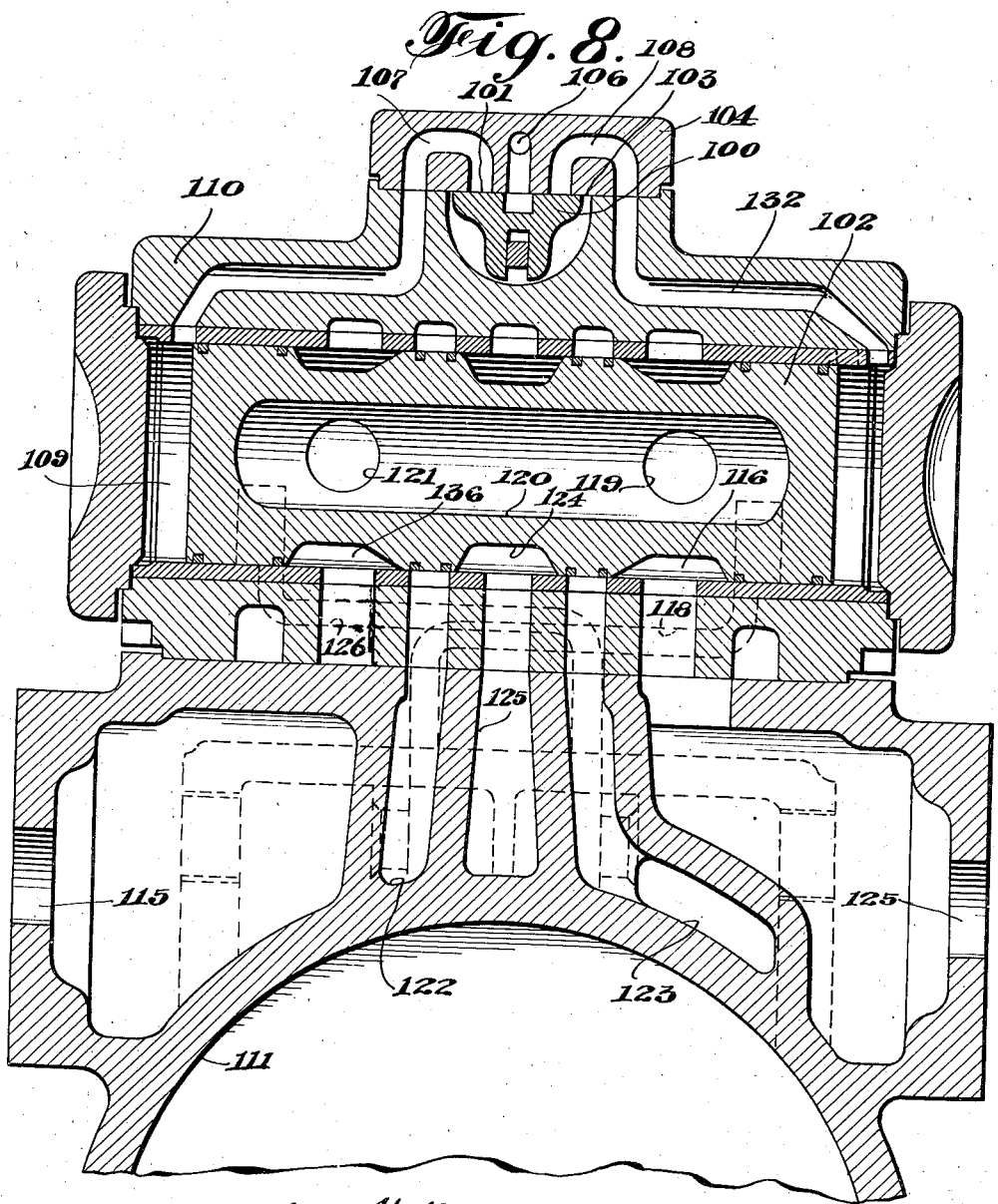
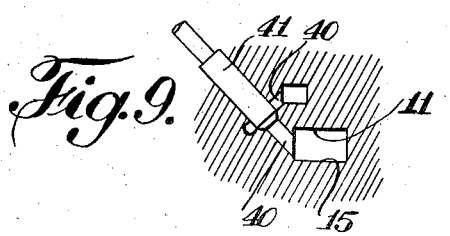
Arthur G. Rockwood
INVENTOR
BY
ATTORNEY Patented Oct. 12, 1937

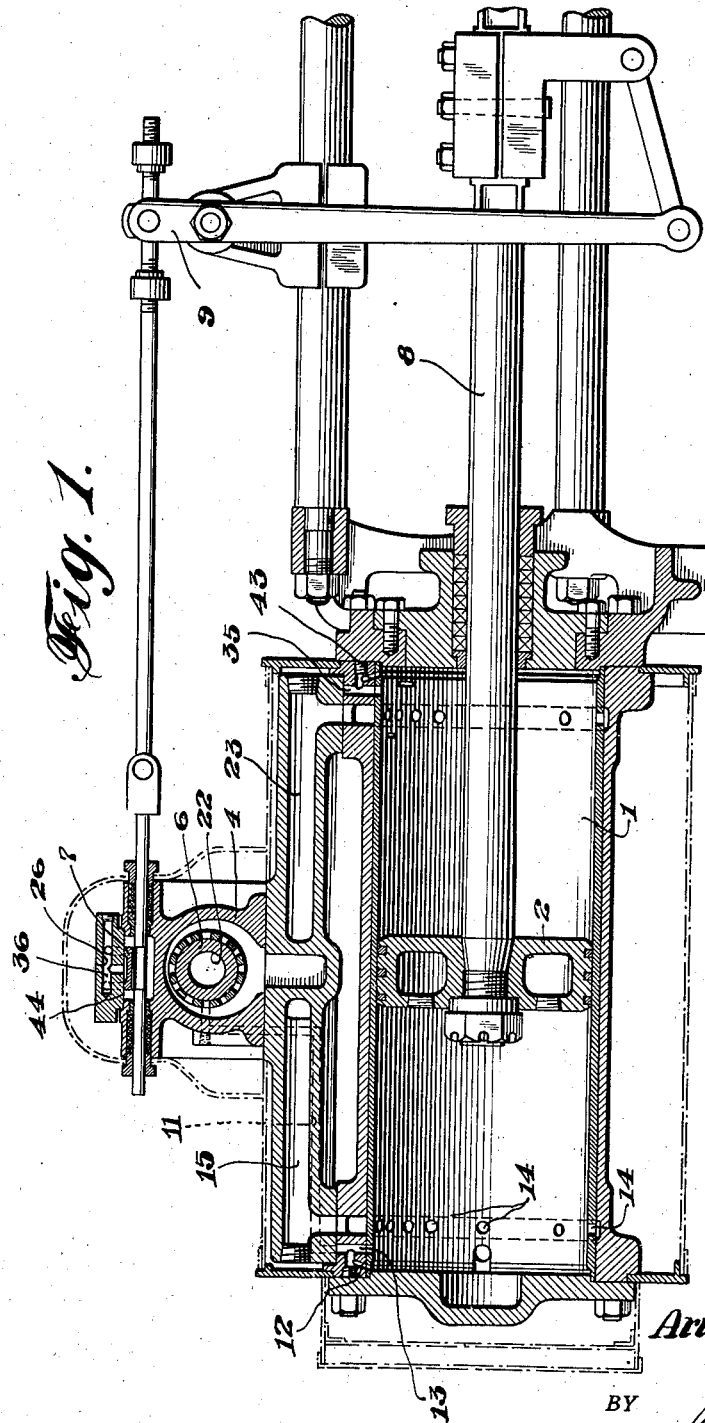

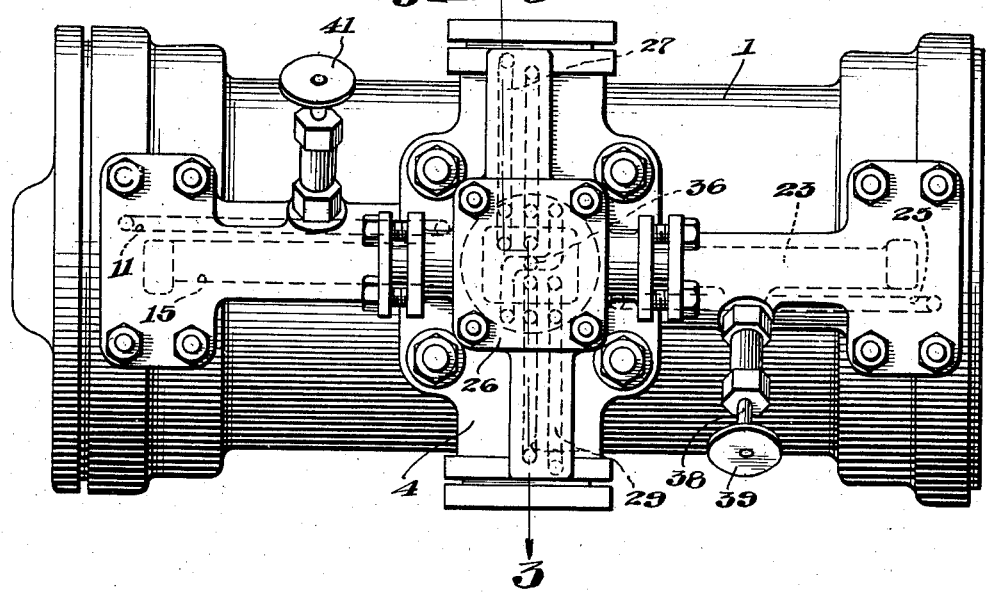
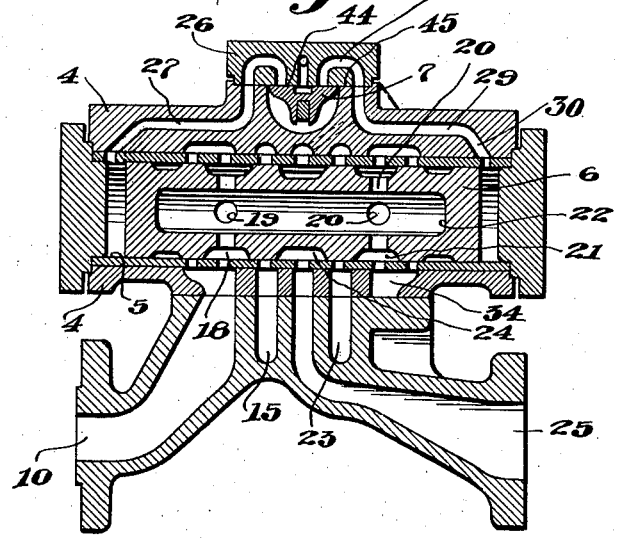

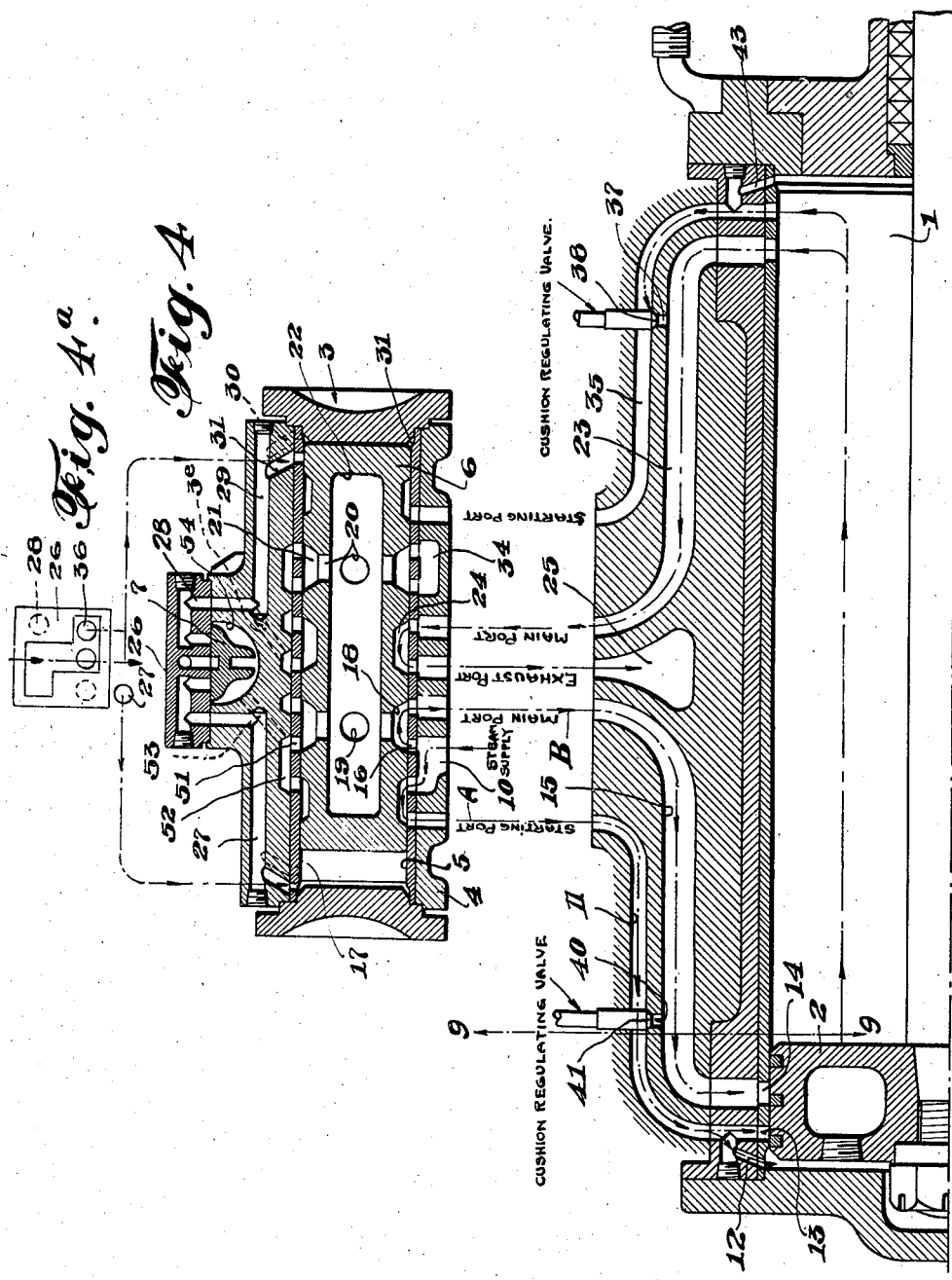

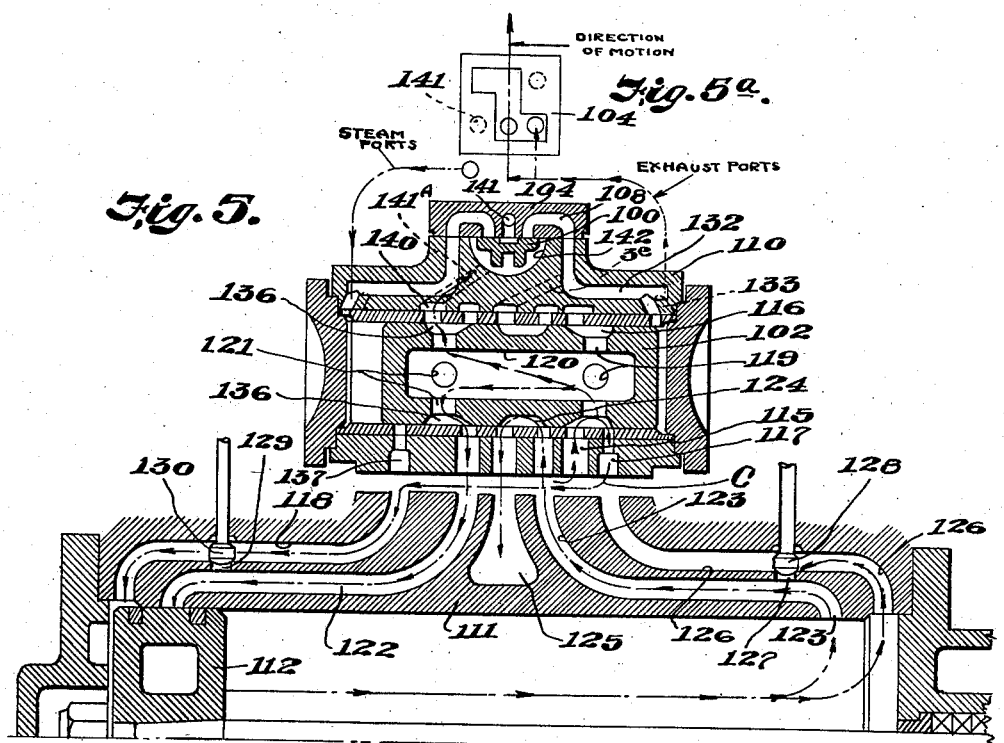
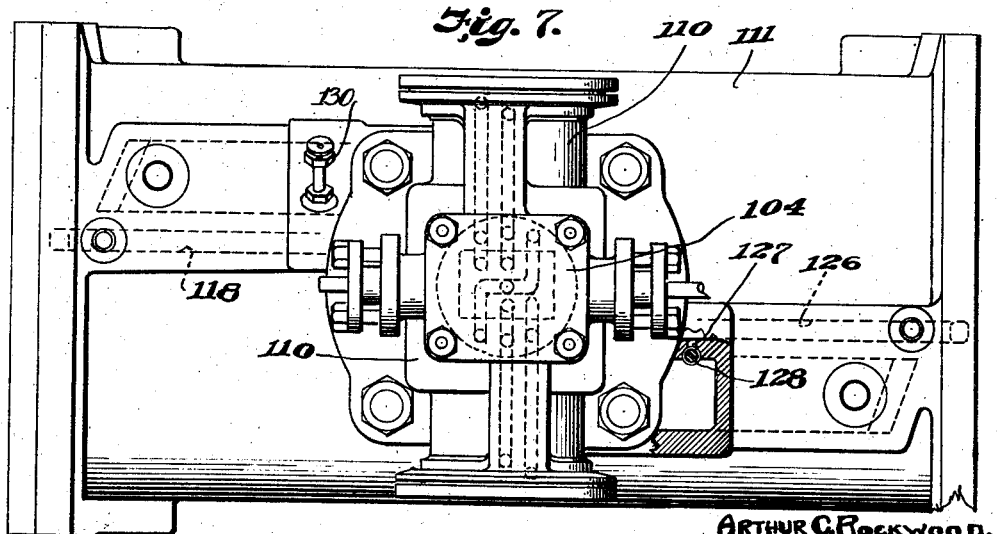

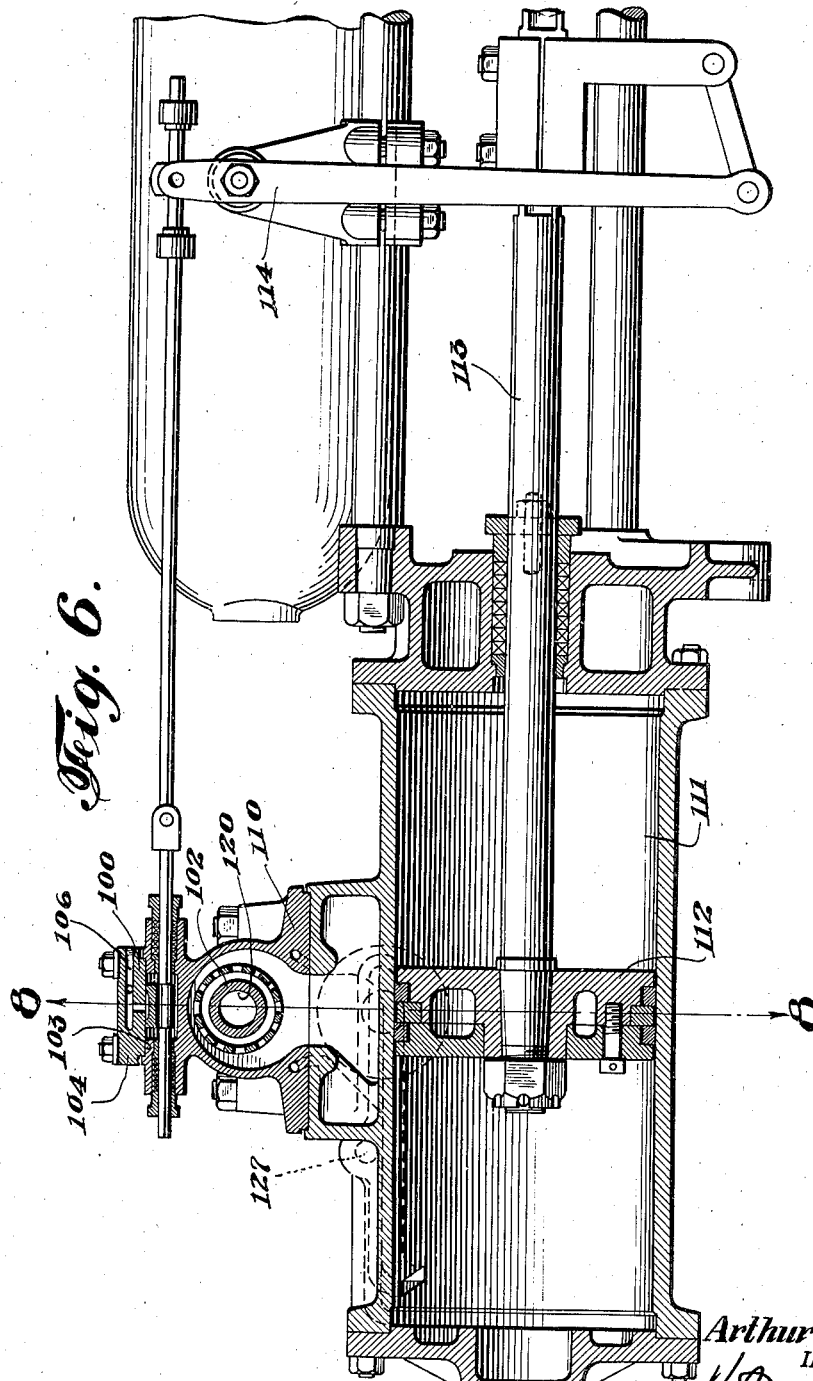

2,095,287

UNITED STATES PATENT OFFICE 2,095,287

STEAM VALVE GEAR

Arthur G. Rockwood, North Arlington, N. J., assignor to Worthington Pump and Machinery Corporation, New York, N. Y., a corporation of Virginia Application June 13, 1935, Serial No. 26,447

10 Claims. (Cl. 121—157)

This invention relates to steam valve gears and an object of the invention is to provide a valve gear for single direct acting pumps which is particularly adapted to present-day steam conditions involving extremely high steam pressure and temperatures and for operation without lubrication.

Another object of the present invention is to provide a steam valve gear embodying the use of a pilot valve or auxiliary slide valve arranged in inverted position to ride on the chest cover, which chest cover forms the valve saddle, thereby improving the accessibility to the slide valve and its saddle, making the valve seat more conveniently replaceable and eliminating the requirement for a separate loose wearing plate and one gasket joint in the valve structure.

A further object of the invention is to provide in a steam valve gear, a steam chest and piston valve provided with separate starting ports which also serve on the reverse stroke as cushion regulating ports; to provide manually operable means to control the delivery of cushioning steam to the ends of the main cylinder, and to pass the steam supply for the ends of the stroke through the piston valve so as to eliminate difficult core work in the construction of the steam chest and/or cylinder.

With these and other objects in view, as may appear from the accompanying specification, the invention consists of various features of construction and combination of parts, which will be first described in connection with the accompanying drawings, showing a steam valve gear of the preferred form embodying the invention, and the features forming the invention will be specifically pointed out in the claims.

In the drawings:

Fig. 1 is a longitudinal section through a steam cylinder showing the improved valve gear applied thereto.

Fig. 2 is a top plan of the steam cylinder and valve gear.

Fig. 3 is a cross section taken on the line 3—3 of Fig. 2.

Fig. 4 is a diagrammatic view in section of the steam valve gear, the steam cylinder, and the steam piston.

Fig. 4A is a detail diagram of the pilot valve and ports.

Fig. 5 is a diagrammatic view in section of a modified form of the steam valve gear.

Fig. 5A is a detail diagram in plan of a part of the steam valve gear being shown in connection with Fig. 5 to more clearly bring out the operation of the valve gear.

Fig. 6 is a longitudinal section through a steam cylinder showing the modified form of valve gear applied thereto.

Fig. 7 is a plan view partly in section, of a steam cylinder and the modified form of valve gear.

Fig. 8 is a detail section taken on the line 8—8 of Fig. 6.

Fig. 9 is a detail section through a part of the valve structure taken approximately on the line 9—9 of the diagrammatic Figure 4. Slight differences in appearance of certain ports is occasioned by the diagrammatic nature of Figure 4.

Referring more particularly to the drawings, the preferred form of the steam valve gear shown in Figs. 1 to 4A inclusive, comprises the valve gear proper in combination with a steam cylinder 1 in which a steam piston 2 reciprocates. The reciprocation of the piston 2 in the cylinder 1 is controlled, through the distribution of operating steam to the cylinder by means of the valve gear 3 which includes the valve chest 4 having a cylinder or cylindrical bore 5 therein in which the steam distributing piston valve 6 reciprocates. The operation of the piston valve 6 is in turn controlled by the auxiliary slide or pilot valve 7. The auxiliary slide valve 7 is in turn operated from the piston rod 8 of the steam piston 2 through the medium of suitable operating gear indicated at 9.

Referring more specifically to the diagrammatic Fig. 4; when the steam piston 2 is at the left-hand end of its stroke in the cylinder 1, the piston valve 6 will be at the right-hand end of its stroke, at which time steam entering the cylindrical bore 5 through the steam supply port 10 will pass, in the direction of the arrows A into the starting passage 11 and through the starting passage into the auxiliary starting passage 12. The auxiliary starting passage 12 opens into the cylinder 1 outwardly of the outer end of the piston 2 and imparts an initial starting movement to the piston which moves the piston sufficient distance to uncover the main outlet 13 of the starting passage 11. The uncovering of the outlet 13 permits a larger quantity of steam to enter the cylinder 1 and imparts further impetus to the piston moving it to the right until the port 14 of the main steam supply passage 15 is opened, at which time the proper amount of operating steam will enter the cylinder and move the piston through its complete stroke towards the right. The main steam port or passage 15 is connected to the steam supply port 10 through the port 16 formed in the cylinder sleeve and through the annular cut-out portion 18 formed in the piston valve 6. The piston valve 6 is provided with a series of ports 19 communicating with the annular groove 18 and a second series of ports 20 communicating with the annular groove 21 formed in the piston valve near its outer end, so that when steam is entering the main steam port 15 as indicated by the arrows B some steam will pass into the hollow bore 22 of the piston valve and outwardly through the ports 20 for delivery to the main steam supply passage 23 for delivering steam to the right-hand end of the cylinder 1.

When the steam piston 2 is at the left-hand end of the cylinder 1 the main steam supply passage 23 acts as a main exhaust port and it is then open through the annular groove 24 formed in the piston valve 6 to the exhaust port 25.

The slide valve 7 controls the movement of the piston valve 6 and consequently indirectly controls the operation of the steam piston 2. In Fig. 4 of the drawings the slide valve 7 is shown in position for delivering operating steam through the slide valve saddle 26 and passage 27 to the left-hand end of the steam chest 4. When in this position the main piston 2, will move to the right and when nearing the end of the stroke the slide valve 7 will be operated to open the port 28 and the passage 30 to steam supply. Steam passing through the passage 28 will pass first through the outermost connecting passage 30 and into the space 31 at the end of the piston valve 6 to impart a movement to the piston valve to the left. The movement of the piston valve 6 to the left cuts off communication between the steam supply port 10 and the main steam passage 15 and the starting passage 11 and opens, through the annular groove 24, the steam passage 15 to the exhaust passage 25. At the same time, it opens the annular passage 34 in the valve chest 4 to the main steam supply port 23 and to the combined cushioning and starting passage 35 at the right-hand end of the cylinder 1. The annular passage 34 has communication, through the annular groove 21, ports 20, ports 19 and annular groove 18 with the steam supply passage 10 for delivering starting steam to the right-hand end of the cylinder to start and move the piston 2 towards the left after it has completed its stroke towards the right. The auxiliary slide valve 7 and the ports 27 and 28 in the saddle 26, as well as the exhaust port 36 therein are so arranged that when operating steam is being delivered to one end of the steam chest 4 the other end will be opened to exhaust.

The steam for moving the piston valve 6 passes from the main steam supply passage 10 through the annular groove 52 and through suitable port 51. From the pocket 52 the steam passes through the passageway 53 (indicated in dotted lines in Fig. 4) into the space or chamber 54 in the valve chest in which the auxiliary or pilot valve 7 slides and thus by controlling the ports 27, 28, and 36, the auxiliary or pilot valve 7 controls the distribution of steam for operating the piston valve 6.

For the purpose of cushioning the steam piston 2 at the ends of its stroke suitable means are provided for pocketing a limited and regulated amount of steam in the ends of the cylinder 1 immediately after the main passages 15 or 23 have been closed by the piston. During the movement of the piston 2, for example to the right, the steam in the cylinder 1 behind the piston exhausts through the passage 23 and a certain amount of this steam exhausts through the passage 35. The passage 35, is however at this time, closed off by the piston valve 6, but a cross-passage or opening 37 is provided which opens from the passage 35 into the passage 23 and outwardly through the main exhaust 25. It is desirable, however, to retain, momentarily, a quantity of steam in the ends of the cylinder after the piston 2 has closed the main port 23 so as to have a gradual slowing up in piston speed when approaching the reversed position. A suitable valve 38 is provided for controlling the cross-port or passage 37 and consequently to permit control of the quantity of connecting steam momentarily held in the end of the cylinder. The valve 38 may be manually operated through any suitable means such as the valve handle 39 clearly shown in Fig. 2 of the drawings. A cross-port 40 is provided to establish communication between the passages 11 and 15 and this cross-port is controlled by a valve 41, manually operated to permit control of the cushioning steam in the left-hand end of the cylinder 1. The valves 38 and 41 are arranged as shown in Figure 9 of the drawings or any other suitable arrangement so as to control the passage of steam through the ports 37 and 40 without closing or blocking the starting passages 11 and 35 respectively.

The starting port 35 has the auxiliary starting passage 43 connected thereto which is similar to and operates exactly in the same manner as the passage 12. These passages 12 and 43 also act as exhaust passages to permit the exhausting of the cushioning steam from the ends of the cylinder.

By particular reference to Figs. 1, 3 and 4 of the drawings it will be noted that the auxiliary slide valve 7 is inverted from the usual position occupied by such valves; that is, its flat slide surface 44 is positioned upwardly or outwardly from the axis of the piston valve 6 and it rides over the inner flat surface 45 of the chest cover 26 and thus the cover 26 also acts as a saddle for the auxiliary slide valve 7. This construction has many advantages in that with the pilot or auxiliary slide valve operating on the valve chest cover 26 as a seat will permit easy access to the auxiliary slide or pilot valve 7 and will permit the cover to be readily removed for refacing the seat 45 when necessary and also in instances where either the seat 45 or the auxiliary valve 7 becomes excessively worn, these parts can be cheaply and easily replaced.

In Figs. 5 to 8 inclusive, a modified form of the improved valve gear is shown. In this modified form, the auxiliary slide or pilot valve 100 is inverted, that is, with its rubbing surface or face 101 facing upwardly or outwardly from the axis of the piston valve 102. The flat slide or surface 101 engages against the flat inner surface 103 of the cover 104 of the valve chest. The cover 104 serves as the saddle for the auxiliary slide or pilot valve 100 and is provided with a steam inlet passage 106 and passages 107 and 108 which deliver steam to the opposite ends of the bore 109 of the valve chest 110 and in which piston valve 102 reciprocates. The auxiliary slide or pilot valve 100 is operated from the piston rod 113 through any approved type of linkage indicated at 114, for properly operating the slide valve at the desired intervals in the cycle of operation in the steam engine to properly control the delivery of steam to and its exhaust from the cylinder 111.

In the diagrammatic Fig. 5 of the drawings the piston valve 102 is shown at the right-hand limit of its stroke at which time the steam entering the steam supply port 115 passes into the annular groove 116 formed in the outer surface of the piston valve 102. Part of the steam passes from the annular groove 116 through the port 117 and through the starting passage 118, as indicated by the arrows C, and through this passageway into the left-hand end of the cylinder 111. That is, the starting steam passes from the right-hand end of the steam chest 110 across and into the left-hand end of the steam cylinder 111 for starting the steam piston 112 on its movement towards right. At the same time that steam is passing through the port 117 the larger quantity of the steam will pass through the series of ports 119 formed in the piston valve 102 and passing through the bore 120 of the piston valve will pass from the bore through the ports 121 into the main steam supply passage 122 for delivering the operating steam to the left-hand end of the cylinder 111 after the piston 112 has been moved under the impetus of the starting steam to open the passage 122 to the cylinder. At the same time that the operating steam is being delivered to the left-hand end of the cylinder 111 the main steam supply passage 123 for the right-hand end of the cylinder 111 will be open through the annular groove 124 to the exhaust port 125 and the starting passage or port 126 for delivering the starting steam to the right-hand end of the cylinder will be open through the by-pass or connecting port 127 with the main port or passage 123 so as to permit the retarded exhaust of the steam from the end of the cylinder 111 beyond the port 123 to provide the desired cushioning action for the piston 112. A valve 128 is provided, which may be manually operated as indicated in Fig. 7 of the drawings for controlling the cross-port or passage 127 to permit manual control of the exhausting of the cushioning steam. The starting port or passage 118 is also connected by means of a cross-port or passage 129 with the main port or passage 122 and this cross-port or passage 129 is controlled by a manually operated valve 130 to permit control of the cushioning steam.

The pilot or auxiliary slide valve 100 will, immediately after the various ports have assumed the position shown in Fig. 5 of the drawings, be operated through the link connection 114 to cut off the delivery of steam to the left-hand end of the bore of the steam chest 110 and to open the right-hand end of the steam chest through the passages 108 and 132 to deliver operating steam through the starting port 133 to start the piston valve 102 on its movement towards the left. When the piston valve 102 is moved to the left-hand limit of its movement the port 122 will be connected to exhaust through the annular groove 124 while the port 123 will be connected to the main steam supply 115 through the annular groove 116. The starting passage 126 will at this time be connected with the steam supply port 115 through the annular groove 136 and port 137 for delivering the starting steam to the right-hand end of the cylinder 111.

The operating steam for operating the piston valve 102 passes from the main steam supply 115 through the ports 119 along the interior of the piston valve and out through the ports 121 and groove 136 into the pocket or groove 140 formed in the steam chest. From here the steam passes through the passage 141A (shown in dotted lines in Fig. 5) into the chamber 142 in which the auxiliary or pilot valve 100 reciprocates. The pilot valve 100 controls the distribution of steam to the ends of the piston valve 102 through the medium of the various ports shown diagrammatically in Figure 5A.

In this modified construction, like in the preferred construction shown in Figures 1 to 4 of the drawings the steam passes through the central bore 120 of the valve piston for delivering to the starting and main supply ports of the steam cylinder thereby providing a simple structure and eliminating much expensive core work in the manufacture of the valve gear. The exhaust of steam from the auxiliary cylinder is controlled by the pilot valve and is led through port 3e into the main exhaust 125. It is to be understood that the valves 128 and 130 and their cooperating ports are arranged substantially in the same manner as the valves 38 and 41 so as not to block off the starting passages 118 and 126.

While in the drawings the steam valve gear is shown with the axis of the piston valve disposed at right angles to the axis of the steam cylinder, it is to be understood that the valve gear may be placed with its axis parallel to, perpendicular to, or in any other suitable position and in any suitable location relative to the steam cylinder and its axis, likewise the steam cover on which the auxiliary valve rides may be placed in any location on the auxiliary cylinder, without departing from the spirit of the present invention.

It will be understood that the invention is not to be limited to the specific construction or arrangement of parts shown but that they may be widely modified within the invention defined by the claims.

What is claimed is:

1. In a steam valve gear, a steam cylinder, a piston therein, a valve chest, a steam piston valve in said valve chest, said steam cylinder provided with main steam supply passages and starting steam supply passages, said main steam supply passages acting as exhaust passages at predetermined times, during the cycle of operation of the valve gear, said cylinder provided with restricted cross ports opening said starting steam passages to said main steam passages and means controlling said cross-passages and regulating the cushioning action of said steam piston.

2. In a steam valve gear, a steam cylinder, a piston therein, a valve chest, a steam piston valve in said valve chest, said steam cylinder provided with main steam supply passages and starting steam supply passages, said main steam supply passages acting as exhaust passages at predetermined times during the cycle of operation of the valve gear, said cylinder provided with restricted cross ports opening said starting steam passages to said main steam passages, and valves for controlling said cross ports.

3. In a steam valve gear, a steam cylinder, a piston therein, a valve chest, a steam piston valve in said valve chest, a slidable pilot valve in said valve chest, a removable cover plate confining said pilot valve in said chest and provided with steam passages for delivering steam to said piston valve, said pilot valve having a flat surface engaging and sliding over the inner surface of said cover plate for controlling passage of steam through said steam passages, said steam cylinder provided with main steam supply passages and starting steam supply passages, said main steam supply passages acting as exhaust passages at predetermined times during the cycle of operation of the valve gear, said cylinder provided with cross ports opening said starting steam passages to said main steam passages and means controlling said cross-passages for regulating the cushioning action of said steam piston.

4. In a steam valve gear, a steam cylinder, a piston therein, a valve chest, a steam piston valve in said valve chest, a slidable pilot valve in said valve chest, a removable cover plate confining said pilot valve in said chest and provided with steam passages for delivering steam to said piston valve, said pilot valve having a flat surface engaging and sliding over the inner surface of said cover plate for controlling passage of steam through said steam passages, said steam cylinder provided with main steam supply passages and starting steam supply passages, said main steam supply passages acting as exhaust passages at predetermined times during the cycle of operation of the valve gear, said cylinder provided with cross ports opening said starting steam passages to said main steam passages, and valves controlling said cross ports.

5. In a steam valve gear, a steam cylinder, a piston therein, a valve chest, a steam piston valve in said valve chest, said steam cylinder provided with main steam supply passages and starting steam supply passages, said main steam supply passages acting as exhaust passages at predetermined times during the cycle of operation of the valve gear, said cylinder provided with restricted cross ports opening said starting steam passages to said main steam passages, a slidable pilot valve in said valve chest, a removable cover plate confining said pilot valve in said chest and provided with passages for delivering steam to said piston valve, said pilot valve having a flat surface facing outwardly from said piston valve and engaging and sliding over the inner surface of said cover plate to control the passage of steam through said cover plate passageways.

6. In a steam valve gear, the combination, of a steam cylinder, a piston therein, a valve chest, a hollow piston valve in the valve chest, said valve chest provided with a steam supply port, said steam cylinder provided with a main steam supply passage and a starting steam supply passage opening into one end of the cylinder and with a second main steam supply passage and a second starting steam supply passage opening into the other end of the cylinder, said piston valve provided with annular grooves and said valve chest provided with ports for connecting said first-named main steam passage and said first-named starting steam passage to said steam supply port, said piston valve being provided with ports opening into its hollow interior, certain of which communicate with said second main steam passage and said second starting steam passage whereby steam will pass through the piston valve for delivery to one end of said steam cylinder.

7. In a steam valve gear, the combination, of a steam cylinder, a piston therein, a valve chest, a hollow piston valve in the valve chest, said valve chest provided with a steam supply port, said steam cylinder provided with a main steam supply passage and a starting steam supply passage opening into one end of the cylinder and with a second main steam supply passage and a second starting steam supply passage opening into the other end of the cylinder, said piston valve provided with annular grooves and said valve chest provided with ports for connecting said first-named main steam passage and said first-named starting steam passage to said steam supply port, said piston valve being provided with ports opening into its hollow interior, certain of which communicate with said second main steam passage and said second starting steam passage whereby steam will pass through the piston valve for delivery to one end of said steam cylinder, said starting steam passage being cross-over passages whereby starting steam will be delivered from the ends of the steam chest to opposite ends of the steam cylinder.

8. In a steam valve gear, the combination, of a steam cylinder, a piston therein, a valve chest, a hollow piston valve in the valve chest, said valve chest provided with a steam supply port, said steam cylinder provided with a main steam supply passage and a starting steam supply passage opening into one end of the cylinder and with a second main steam supply passage and a second starting steam supply passage opening into the other end of the cylinder, said piston valve provided with annular grooves and said valve chest provided with ports and connecting said first-named main steam passage and said first-named starting steam passage to said steam supply port, said piston valve being provided with ports opening into its hollow interior, certain of which communicate with said second main steam passage and said second starting steam passage whereby steam will pass through the piston valve for delivery to one end of said steam cylinder, said main steam supply passages acting as exhaust passages at predetermined times during the cycle of operation of the valve gear, said cylinder provided with restricted cross ports opening said starting steam passages to said main steam passages.

9. In a steam valve gear, the combination, of a steam cylinder, a piston therein, a valve chest, a hollow piston valve in the valve chest, said valve chest provided with a steam supply port, said steam cylinder provided with a main steam supply passage and a starting steam supply passage opening into one end of the cylinder and with a second main steam supply passage and a second starting steam supply passage opening into the other end of the cylinder, said piston valve provided with annular grooves and said valve chest provided with ports and connecting said first-named main steam passage and said first-named starting steam passage to said steam supply port, said piston valve being provided with ports opening into its hollow interior, certain of which communicate with said second main steam passage and said second starting steam passage whereby steam will pass through the piston valve for delivery to one end of said steam cylinder, said main steam supply passages acting as exhaust passages at predetermined times during the cycle of operation of the valve gear, said cylinder provided with restricted cross ports opening said starting steam passages to said main steam passages, and valves controlling said cross-ports.

10. In a steam valve gear, the combination, of a steam cylinder, a piston therein, a valve chest, a hollow piston valve in the valve chest, said valve chest provided with a steam supply port, said steam cylinder provided with a main steam supply passage and a starting steam supply passage opening into one end of the cylinder and with a second main steam supply passage and a second starting steam supply passage opening into the other end of the cylinder, said piston valve provided with annular grooves and said valve chest provided with ports for connecting said first-named main steam passage and said first-named starting steam passage to said steam supply port, said piston valve being provided with ports opening into its hollow interior, certain of which communicate with said second main steam passage and said second starting steam passage whereby steam will pass through the piston valve for delivery to one end of said steam cylinder, said starting steam passages being crossover passages whereby starting steam will be delivered from the ends of the steam chest to opposite ends of the steam cylinder, said main steam supply passages acting as exhaust passages at predetermined times during the cycle of operation of the valve gear, said cylinder provided with restricted cross-ports opening said starting steam passages to said main steam passage and means controlling said cross-ports for regulating the cushioning action of said steam piston.

ARTHUR G. ROCKWOOD.